(12) United States Patent
Kuchler

(10) Patent No.: US 12,205,781 B2
(45) Date of Patent: Jan. 21, 2025

(54) BASE UNIT FOR A KEYBOARD, ACCESSORY MODULE FOR A KEYBOARD, AND KEYBOARD

(71) Applicant: Cherry Europe GmbH, Auerbach i. d. Opf. (DE)

(72) Inventor: Marcus Kuchler, Munich (DE)

(73) Assignee: Cherry Europe GmbH, Auerbach i. d. Opf. (DE)

( * ) Notice: Subject to any disclaimer, the term of this patent is extended or adjusted under 35 U.S.C. 154(b) by 0 days.

(21) Appl. No.: 18/080,961

(22) Filed: Dec. 14, 2022

(65) Prior Publication Data
US 2023/0187150 A1    Jun. 15, 2023

(30) Foreign Application Priority Data

Dec. 14, 2021 (DE) .......................... 202021003772.1
Oct. 13, 2022 (DE) .......................... 102022126779.2

(51) Int. Cl.
*H01H 13/70* (2006.01)
*G06F 3/02* (2006.01)

(52) U.S. Cl.
CPC ........... *H01H 13/70* (2013.01); *G06F 3/0202* (2013.01)

(58) Field of Classification Search
CPC .............................. H01H 13/70; G03F 3/0202
See application file for complete search history.

(56) References Cited

U.S. PATENT DOCUMENTS

| 5,661,641 | A | * | 8/1997 | Shindo | H04M 1/0235 D14/181 |
|---|---|---|---|---|---|
| 6,489,949 | B1 | * | 12/2002 | Yin | G06F 3/0202 361/679.2 |
| 2001/0029128 | A1 | * | 10/2001 | Horiuchi | H01R 12/79 439/578 |
| 2001/0037936 | A1 | * | 11/2001 | Hsu | H01H 3/125 200/344 |
| 2001/0041088 | A1 | * | 11/2001 | Lebeau | G06F 3/0202 400/714 |
| 2002/0126025 | A1 | * | 9/2002 | Wang | G06F 3/0213 345/157 |

(Continued)

*Primary Examiner* — David H Banh
(74) *Attorney, Agent, or Firm* — Stites & Harbison, PLLC; James R. Hayne

(57) ABSTRACT

A base unit for a keyboard is presented. The base unit has a substantially rectangular layout. The base unit includes an equipment portion, formed so that it can be equipped with a plurality of key switches for the keyboard. The equipment portion is arranged on a first side of the base unit. The base unit further comprises at least one coupling portion for mechanically coupling the base unit to an accessory module for the keyboard. Each coupling portion includes a first coupling feature and a second coupling feature. The first coupling feature is arranged on the first side of the base unit, and the second coupling feature is arranged on a second side of the base unit facing away from the first side. Each coupling feature is arranged parallel to a long side of the base unit continuously between narrow sides of the base unit. The first coupling feature is formed for positive locking with a first mounting feature of the accessory module. The second coupling feature is formed for positive locking with a second mounting feature of the accessory module.

19 Claims, 13 Drawing Sheets

(56) References Cited

U.S. PATENT DOCUMENTS

| | | | | |
|---|---|---|---|---|
| 2004/0234319 A1* | 11/2004 | Lee | | A47B 21/0314 400/714 |
| 2005/0079902 A1* | 4/2005 | Chen | | H04M 1/0237 455/575.8 |
| 2006/0180450 A1* | 8/2006 | Clark | | B08B 1/006 200/333 |
| 2007/0045392 A1* | 3/2007 | Youens | | G06F 3/0216 235/145 R |
| 2007/0117599 A1* | 5/2007 | Kumar | | H04M 1/0237 455/575.3 |
| 2008/0058034 A1* | 3/2008 | Lu | | H04M 1/0237 455/575.1 |
| 2010/0264220 A1* | 10/2010 | Hubner | | G06F 3/021 235/483 |
| 2010/0302168 A1* | 12/2010 | Giancarlo | | G06F 3/0393 345/169 |
| 2012/0229309 A1* | 9/2012 | Liu | | H01H 13/86 341/22 |
| 2012/0327594 A1* | 12/2012 | Gengler | | G06F 1/1632 361/679.01 |
| 2013/0134061 A1* | 5/2013 | Wu | | G06F 1/1626 206/320 |
| 2013/0203473 A1* | 8/2013 | Kota | | H04M 1/0256 455/575.8 |
| 2013/0215565 A1* | 8/2013 | Nakada | | G06F 1/1649 361/679.09 |
| 2014/0071607 A1* | 3/2014 | Frinak | | G06F 1/1624 361/679.09 |
| 2014/0104761 A1* | 4/2014 | Hsu | | H05K 7/1401 361/679.01 |
| 2014/0211393 A1* | 7/2014 | Lee | | G06F 1/1632 361/679.12 |
| 2014/0218855 A1* | 8/2014 | Fujino | | G06F 1/1681 361/679.29 |
| 2015/0116918 A1* | 4/2015 | Wu | | G06F 3/0202 361/679.08 |
| 2016/0186925 A1* | 6/2016 | Bettin | | F16M 11/045 248/223.41 |
| 2018/0307325 A1* | 10/2018 | Gengler | | G06F 1/1656 |
| 2020/0097045 A1* | 3/2020 | Claudepierre | | H04M 1/72409 |

* cited by examiner

BASE UNIT FOR A KEYBOARD, ACCESSORY MODULE FOR A KEYBOARD, AND KEYBOARD

The present invention relates to a base unit for a keyboard, to an accessory module for a keyboard, and to a keyboard.

For keyboards, such as may be employed in connection with computers, for example, dockable numeric keypads or the like may be provided, wherein such a numeric keypad may be docked to a basic keyboard as an additional module.

Against this background, the present invention provides an improved base unit for a keyboard, improved accessory module for a keyboard, and an improved keyboard in accordance with the main claims. Advantageous embodiments result from the dependent claims and the subsequent description.

According to embodiments of the present invention, in particular, a modular solution for a keyboard may be provided. For example, a base unit which may also function as an autonomous keyboard, may be provided here, wherein the base unit may be formed to be coupleable at least one accessory module. Thus, there may be provided a keyboard which may flexibly be adapted to any employment requirements. By coupling at least one accessory module with the base unit, stability of the keyboard, ease of use of the keyboard and additionally or alternatively a scope of functions of the keyboard may be enhanced. The base unit may be provided to be lightweight, flat and inexpensive as well as optionally also with exchangeable keycaps and exchangeable key switches or key modules.

What is presented is a base unit for a keyboard, wherein the keyboard has a substantially rectangular layout, wherein the base unit comprises:

an equipment portion, formed so that it can be equipped with a plurality of key switches for the keyboard, wherein the equipment portion is arranged on a first side of the base unit; and at least one coupling portion for mechanically coupling the base unit to the accessory module for the keyboard, wherein each coupling portion comprises a first coupling feature and a second coupling feature, wherein the first coupling feature is arranged on the first side of the base unit and the second coupling feature is arranged on a second side of the base unit facing away from the first side, wherein each coupling feature is formed along a long side of the base unit between narrow sides of the base unit, wherein the first coupling feature is formed for positive locking with a first mounting feature of the accessory module, wherein the second coupling feature is formed for positive locking with a second mounting feature of the accessory module.

For example, the keyboard may be provided for a computer or the like. The base unit may be configured as a basic keyboard or keyboard with basic functions. Herein, the baseline may represent the keyboard. The base unit, and thus also the keyboard, may comprise at least one key, wherein at least one key switch, also referred to as key module, may be provided per key. A keycap or key button may represent a part of the key visible to an operator. A key switch may comprise a keycap may be coupleable or coupled to a keycap. A key switch is configured to effect or enable transformation of actuation or actuation force to a key signal. The base unit and additionally or alternatively the keyboard may comprise a wireless or wired transmission interface for transmitting the key signal or information generated by actuating the at least one key. The wired transmission interface may comprise a terminal for a plug of a connection cable and optionally also the connection cable. The base unit may be formed at least partially of plastics.

The base unit may comprise a circuit board and a housing for the circuit board. The circuit board may comprise at least one electric circuit for the at least one key switch. The at least one accessory module may be coupleable to the coupling portion and thus the base unit by sliding or plugging it into the base unit along the respective long side thereof. The equipment portion may comprise at least one holding element for holding the at least one key switch. The coupling features of the base unit and the mounting features of the accessory module may be formed so as to be complementary to each other. The first side and the second side of the base unit may be main sides of a base unit formed in a plate-shaped manner.

According to an embodiment, each coupling feature may be formed so as to be parallel to a long side of the base unit and additionally or alternatively so as to be continuous between narrow sides of the base unit.

According to an embodiment, at least one of the coupling features may be a, wherein at least one of the mounting features may be a rail. As an alternative, at least one of the coupling features may be a rail, wherein at least one of the mounting features may be a groove. In particular, all coupling features may be grooves, and all mounting features may be rails, or alternatively all coupling features may be rails, and all mounting features may be grooves. For each groove, the base unit or the keyboard may comprise a silicone strip or the like, with which the groove may be filled when the base unit is decoupled from the at least one accessory module. Each such groove may be formed as a regular or irregular depression, which may extend in a video, curved and additionally or alternatively angled way. Such an embodiment offers the advantage that simple and robust coupling between the base unit and the at least one accessory module can be achieved by way of groove and tongue or similar positive locking.

Also, the base unit may comprise two coupling portions. Herein, the equipment portion may be arranged between the coupling portions. Such an embodiment offers the advantage that an accessory module or two accessory modules may be coupled to the base unit. Thus, a scope of functions of the keyboard can be expanded in a customizable manner.

Furthermore, the base unit may comprise at least one groove formed on the second side of the base unit, in particular formed so as to be parallel to a long side of the base unit and continuous between narrow sides of the base unit. Herein, each groove may be formed to accommodate at least one pedestal for the base unit. At least one land or at least one rib may be arranged in each groove, wherein each land or each rib may be formed to hold or fix a pedestal. Such an embodiment offers the advantage that secure footing of the base unit, and thus of the keyboard, can be achieved in a simple manner.

Herein, the base unit may also comprise at least one pedestal. Herein, each pedestal may be mechanically coupleable or coupled to the at least one groove. Therein, each pedestal may be mechanically coupleable or coupled to the at least one groove by way of positive locking. Different pedestals may be provided, the materials of which differ from each other in terms of their degrees of hardness. Such an embodiment offers the advantage that reliable footing of the base unit, and thus also of the keyboard, may be realized also on various substrate materials.

What is also presented is an accessory module for a keyboard, wherein the accessory module is mechanically coupleable to an embodiment of the base unit mentioned herein, wherein the accessory module comprises the first mounting feature and the second mounting feature, wherein the accessory module, in in a state thereof in which it is coupled to the base unit, is formed to clasp around a long side of the base unit.

Such an accessory module is advantageously employable or usable in connection with an embodiment of the base unit mentioned herein, in order to enhance ease-of-use and additionally or alternatively a scope of functions of the keyboard. The accessory module is formed so as to be coupleable to a coupling portion of the base unit.

To this end, the accessory module includes the mounting features. The accessory module may also be referred to as a profile rail. The accessory module may be formed of plastics, wood, glass, carbon fiber or metal, for example.

According to an embodiment, at least a body of the accessory module may be formed of aluminum. Additionally or alternatively, a cutout for feeding through a plug of a connection cable for the keyboard to the base unit may be formed in the accessory module. Such an embodiment offers the advantage that stiffness of the keyboard against bending can be increased by such an accessory module. Thus, the keyboard can be made especially stiff and durable by such an accessory module reinforcing the keyboard. A cutout for such a plug may enable safe electric connection of the base unit, and thus of the keyboard.

Also, the accessory module may comprise at least one groove. Herein, each groove may be formed to accommodate at least one pedestal for the accessory module. As an optional addition, the accessory module may comprise at least one pedestal. Herein, each pedestal may be mechanically coupleable or coupled to the at least one groove. At least one pedestal may be slid into each groove. Different pedestals may be provided, with their materials differing from each other regarding their degrees of hardness. Such an embodiment offers the advantage that secure footing also of the accessory module, and thus of the keyboard, can be achieved easily, also adapted to various substrate materials if necessary.

According to an embodiment, the accessory module may comprise at least one foot with a threaded bar and a nut element for screwing the threaded bar in. The foot may be formed at least partially of silicone, rubber or the like. Such an embodiment offers the advantage that continuous height adjustment of the at least one foot can be realized so that individual height adjustment and/or tilt adjustment of the keyboard can be realized by such an accessory module.

Herein, the accessory module may also comprise an elastic means for supporting the nut element. The elastic means may be realized as a coil spring, in particular a compression spring, or as a damper element, in particular out of silicone. The coil spring or the damper element may be provided in various versions with a difference degrees of hardness and may be exchangeable. Such an embodiment offers the advantage that suitable dampening properties for the at least one foot, and thus for the footing of the keyboard, can be achieved for any application.

Furthermore, each foot may be continuously adjustable individually by means of the threaded bar and the nut element. Thus, the keyboard may also stand on an uneven surface, such as a warped table, without wobbling.

According to an embodiment, the accessory module may comprise an accommodation portion for accommodating at least one key switch and a circuit board with an electric circuit for the at least one key switch. The accommodation portion may comprise at least one holding element for holding the at least one key switch. The accessory module may further comprise the at least one key switch, wherein the at least one key switch may be accommodated in the accommodation portion. In particular, the accessory module may comprise an accommodation portion for accommodating a plurality of key switch is arranged in a row. Herein, the accessory module may also be referred to as a key bar or an additional key module. Such an embodiment offers the advantage that a scope of functions of the keyboard can be expanded by such an accessory module.

Herein, the accommodation portion may be formed as an insert out of plastics. Herein, the accommodation portion may be arranged in a body of the accessory module. The circuit board may be arranged between the accommodation portion and the body. The body may be formed of aluminum or another metal, for example. Such an embodiment offers the advantage that an additional key module can be realized in a simple and inexpensive manner.

Furthermore, the accessory module may comprise an external electric terminal for connecting to a plug of a connection cable and a connecting cable for electrically connecting the accessory module to the base unit. Herein, the external electric connection may be electrically connected to the circuit board of the accessory module and to the connecting cable. Thus, the accessory module may be electrically connectable to the base unit by means of the connecting cable and to an external device, such as a computer or the like, by means of the connection cable. Such an embodiment offers the advantage that the expansion of the base unit by such an accessory module can be realized easily and inexpensively in terms of a cabling of the components.

Also, the accessory module may be realized as a hand heel rest. Herein, as an optional addition, the hand heel rest may comprise a hand rest portion which is formed of a different material from that of a body of the accessory module and/or in which there is arranged a window for introducing a decor element. The hand rest portion may be formed of leather, silicone or another material, for example. The window may comprise a transparent cover for the decor element. The decor element may be a photograph, a decor foil or the like. The decor element may be provided by a user. Such an embodiment offers the advantage that ease of use and economics of the keyboard can be enhanced by such an accessory module. Additionally or alternatively, an optical impression and/or recognition of the keyboard can improved by such an accessory module with decor element.

What is also presented is a keyboard, wherein the keyboard comprises:

an embodiment of a base unit mentioned herein; and at least one exemplar of an embodiment of an accessory module mentioned herein, which is mechanically coupleable or coupled to the at least one coupling portion of the base unit.

In connection with the keyboard, an embodiment of the base unit mentioned herein may thus be employed or used advantageously, in order to couple at least one exemplar of an embodiment of the accessory module mentioned herein so that a modular keyboard out of the base unit and additionally at least one accessory module can be provided.

According to an embodiment, the base unit may electronically be configured as a slave device. Herein, an accessory module may electronically be configured as a master device. A slave device may be a USB slave. A master device may be a USB Master or USB hub. Configuration as a slave device or a master device may mean that an electric circuit of a circuit board of the base unit and an electric circuit of a circuit board of the accessory module are configured correspondingly. In this way it can be achieved that the base unit does not need any different electronic components and may thus stay inexpensive.

The invention shall be explained in greater detail by way of example on the basis of the attached drawings, in which.

In the subsequent description of preferred embodiments of the present invention, the same or similar reference numerals shall be used for the similarly acting elements depicted in the various figures, wherein repeated description of these elements shall be omitted.

Figure 1:
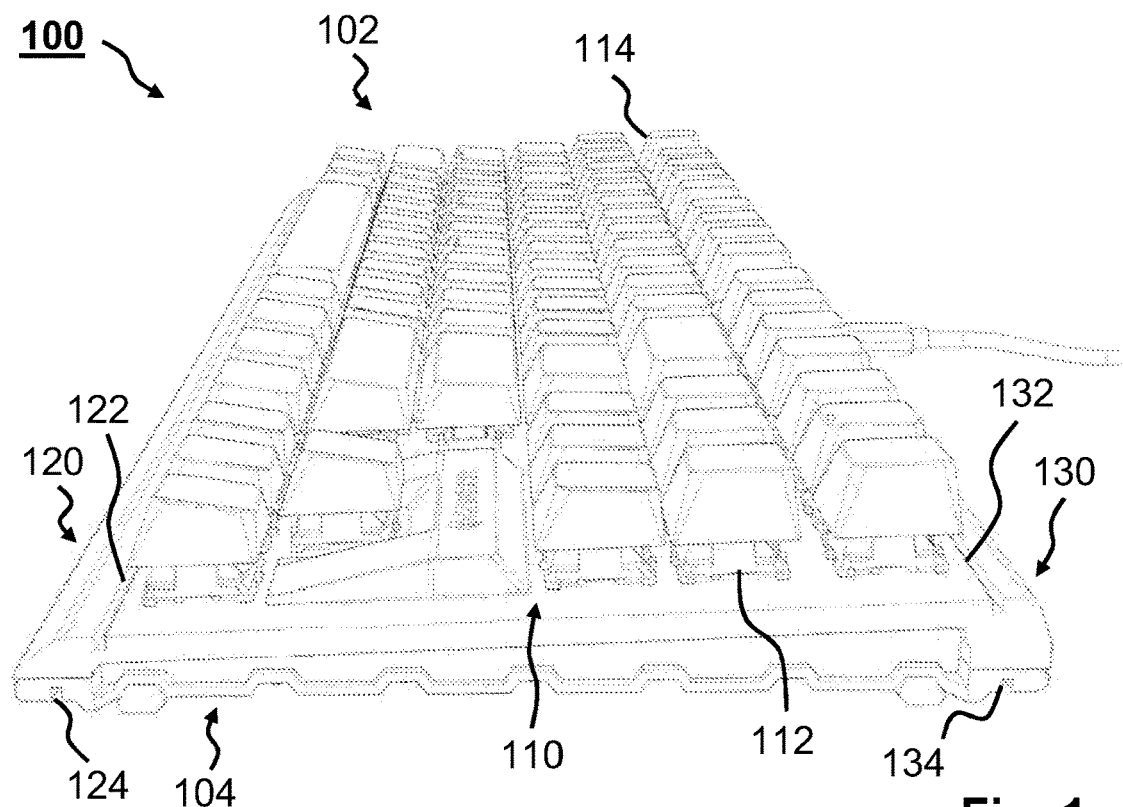
FIG. 1 shows an oblique top view of a base unit according to an embodiment.

FIG. 1 shows an oblique top view of a base unit 100 according to an embodiment. The base unit 100 has a rectangular layout with two opposite long sides, two opposite narrow sides, a first side 102 or the first main surface and a second side 104 or second main surface facing away from the first side 102. Herein, the oblique top view shows the base unit 100 from one of the narrow sides only as an example. In a ready-to-use arrangement of the base unit 100, the first side 102 represents a top side facing a user, wherein the second side 104 represents a bottom side facing a resting surface for the base unit 100 in a ready-to-use arrangement of the base unit 100.

The base unit 100 is provided for a keyboard, such as a computer keyboard. The base unit 100 may optionally function as an autonomous keyboard. In the illustration of FIG. 1, for example, a connection cable is shown connected to the base unit 100. The base unit 100 includes an equipment portion 110 and at least one coupling portion 120, 130.

The equipment portion 110 is arranged on the first side 102 of the base unit. The equipment portion 110 is formed so as to be equippable with a plurality of key switches 112 for the keyboard. In the illustration of FIG. 1, the equipment portion 110 is equipped with the plurality of key switches 112. In other words, a plurality of key switches 112 are arranged or fixed on the equipment portion 110. For example, the key switches 112 are realized as mechanical key switches. Each key switch 112 is shown with a keycap 114 as an example only.

The at least one coupling portion 120, 130 is formed for mechanical coupling of the base unit 100 with an accessory module for the keyboard. Each coupling portion 120, 130 includes a first coupling feature 122, 132 and a second coupling feature 124, 134. The first coupling feature 122, 132 is arranged on the first side 102 of the base unit 100. The first coupling feature 122, 132 is formed for positive locking with a first mounting feature of an accessory module. The second coupling feature 124, 134 is arranged on the second side 104 of the base unit 100. The second coupling feature 124, 134 is formed for positive locking with a second mounting feature of an accessory module. Thus, the first coupling feature 122, 132 and the second coupling feature 124, 134 are formed on opposite sides 102, 104 of the base unit 100. Each coupling feature 122, 124, 132, 134 is formed along or parallel to a long side of the base unit 100 and/or continuously between both narrow sides of the base unit 100.

According to the embodiment illustrated here, the coupling features 122, 124, 132, 134 are formed as grooves or each coupling feature 122, 124, 132, 134 is formed as a groove. Correspondingly, each mounting feature of the accessory module is formed as a rail here. According to the embodiment illustrated here, the base unit 100 includes a first coupling portion 120 and a second coupling portion 130. The equipment portion 110 is arranged between both coupling portions 120 and 130. The first coupling portion 120 includes a first coupling feature 122, or a first groove here, and a second coupling feature 124, or a second groove here. The first coupling portion 120 is arranged in the region of a first long side of the base unit 100. The second coupling portion 120 includes a first coupling feature 132, or a first groove here, and a second coupling feature 134, or a second groove here. The second coupling portion 130 is arranged in the region of a second long side of the base unit 100.

Figure 2:
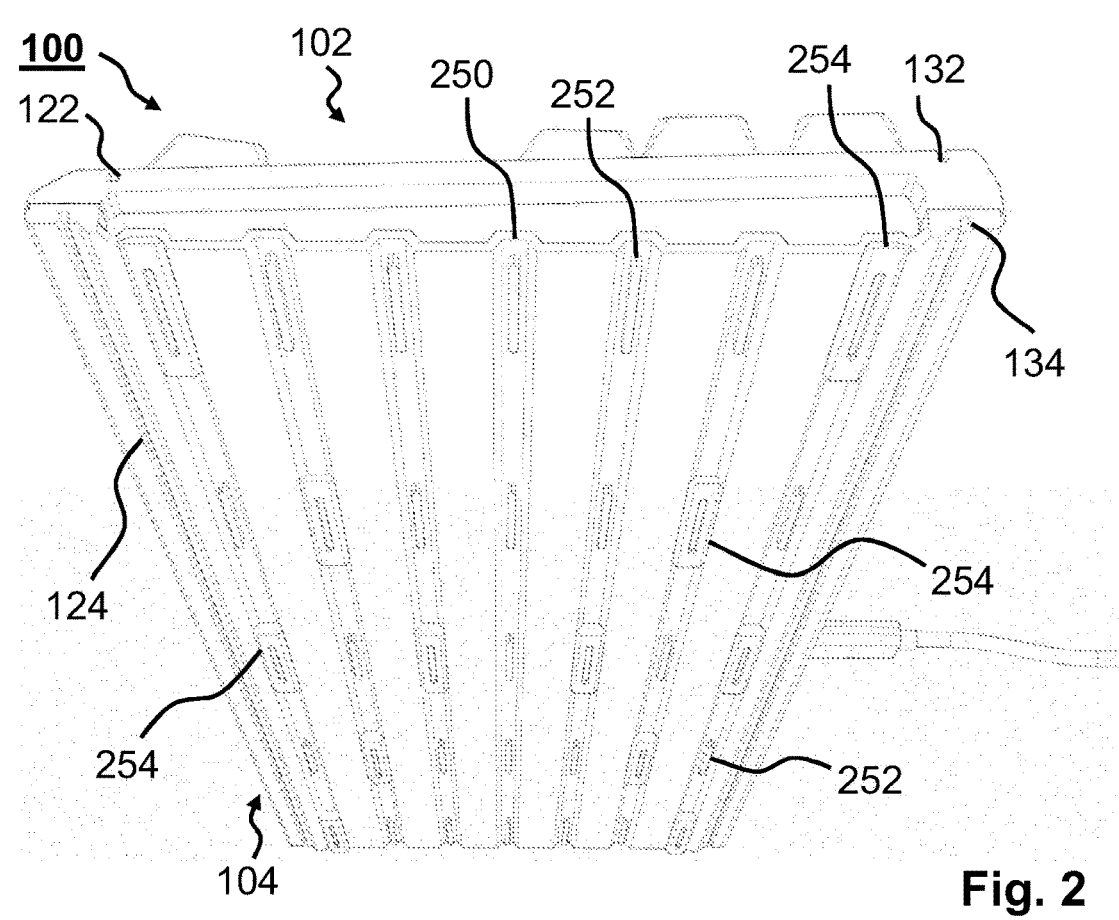
FIG. 2 shows an oblique bottom view of the base unit from FIG. 1.

FIG. 2 shows an oblique bottom view of the base unit 100 from FIG. 1. In other words, oblique top view onto the second side 104 of the base unit 100 is illustrated here. Herein, the first side 102, the second side 104, the coupling features 122 and 124 of the first coupling portion, the coupling features 132 and 134 of the second coupling portion, a plurality of grooves 250, lands 252 or ribs and pedestals 254 are shown of the base unit 100 in the illustration of FIG. 2.

According to an embodiment, the base unit 120 includes at least one groove 250, which is formed on the second side 120 of the base unit 100. According to the embodiment illustrated here, the base unit 120 includes a plurality of grooves 250. The grooves 250 here are formed to be parallel to the long side of the base unit 100 continuously between narrow sides of the base unit. For example, a plurality of lands 252 are arranged in each 250. Each groove 250 is formed to accommodate at least one pedestal 254 for the base unit 100. Each pedestal 254 is mechanically couplable, or coupled as shown in FIG. 2, to one of the grooves 250. Here, each pedestal 254 is fixed on one of the lands 252. For example, a plurality of pedestals 254 are provided, wherein the pedestals 254 are formed to be identical or partially different from each other regarding their degrees of hardness. The pedestals 254 are formed of silicone, rubber or the like, for example.

Figure 3:
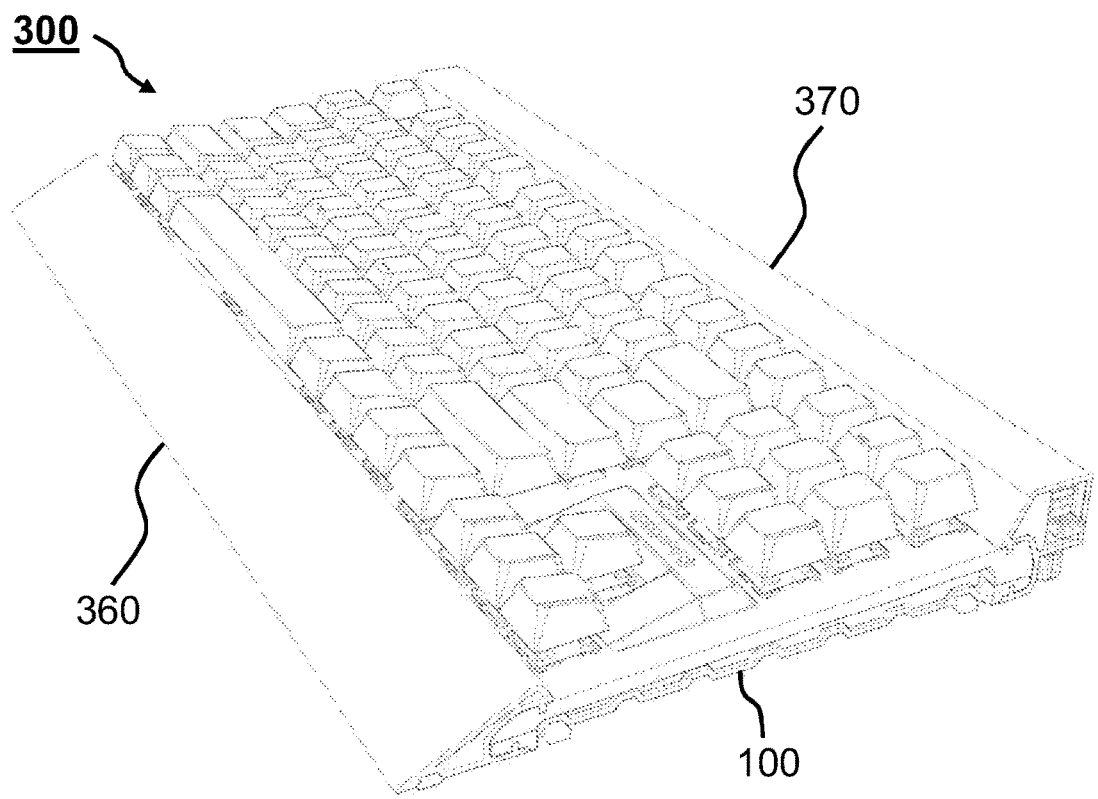
FIG. 3 shows an oblique top view of a keyboard according to an embodiment in a coupled state.

FIG. 3 shows an oblique top view of a keyboard 300 according to an embodiment in a coupled state. The keyboard 300 includes the base unit 100 from one of the previously described figures or a similar base unit. Furthermore, the keyboard 300 includes at least one accessory module 360, 370. The at least one accessory module 360, 370 is mechanically coupleable or coupled to the at least one coupling portion of the base unit 100. In the coupled state, the at least one accessory module 360, 370 is mechanically coupled to the keyboard 300, more specifically mechanically to the at least one coupling portion of the base unit 100. The at least one accessory module 360, 370, in in a state thereof in which it is coupled to the base unit 100, is formed to clasp around a long side of the base unit 100. According to an embodiment, the base unit 100 is electronically configured as a slave device or a USB slave, wherein an accessory module 360, 370 is electronically configured as a master device or USB master or USB hub.

According to the embodiment illustrated here, the keyboard 300 includes a first accessory module 360 and a second accessory module 370. The first accessory module 360 is mechanically coupled to the first coupling portion of the base unit 100, and the second accessory module 370 is mechanically coupled to the second coupling portion of the base unit 100, i.e. the coupled state is given. In the coupled state, the first accessory module 360 clasps around a first long side of the base unit 100, and the second accessory module 370 clasps around a second long side of the base unit 100. According to the embodiment illustrated here, the first accessory module 360 is formed as a hand heel rest.

Figure 4:
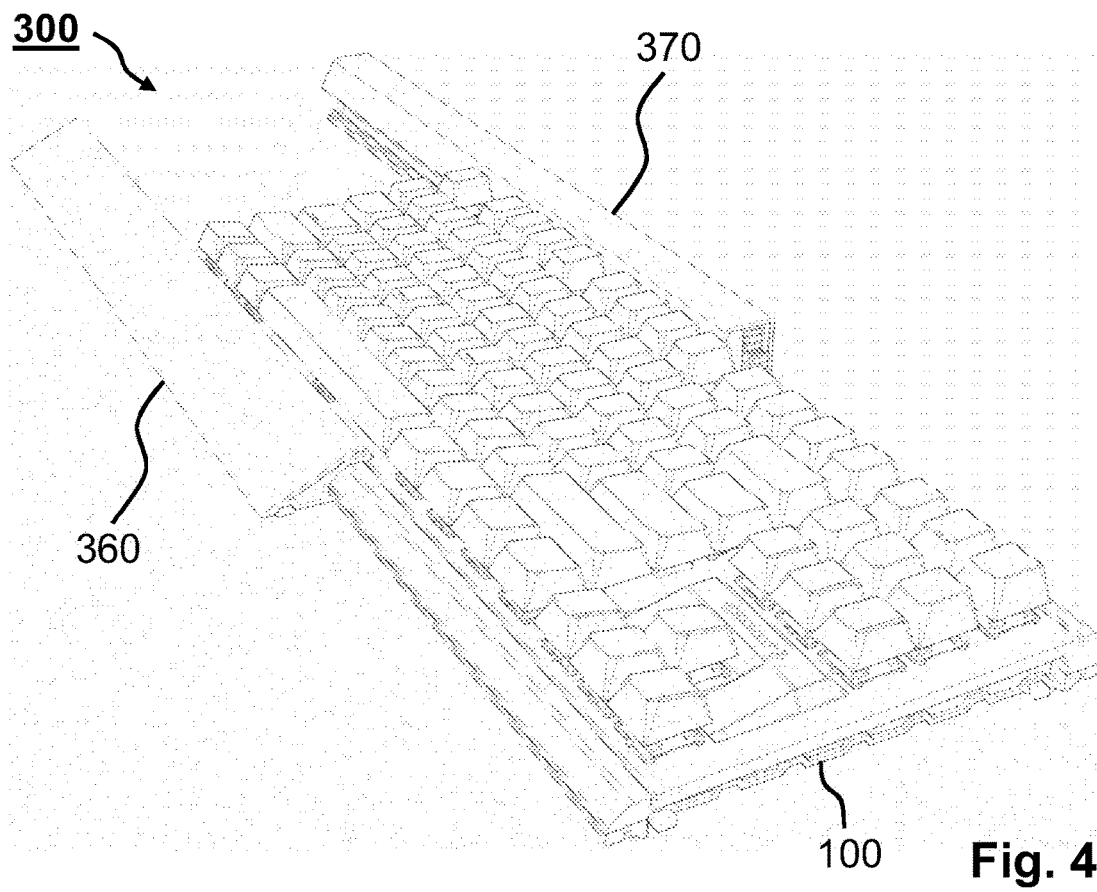
FIG. 4 shows an oblique top view of the keyboard from FIG. 3 in a partially coupled state.

FIG. 4 shows an oblique top view of the keyboard from FIG. 3 in a partially coupled state. In the partially coupled state, the accessory modules 360 and 370 are shown during a coupling process by sliding the same onto the coupling portions of the base unit 100. By way of example only, the accessory modules 360 and 370 are shown half slid onto the coupling portions of the base unit 100 in the illustration of FIG. 4. Particularly the accessory modules 360 and 370 shall be explained in greater detail with reference to subsequent figures.

Figure 5:
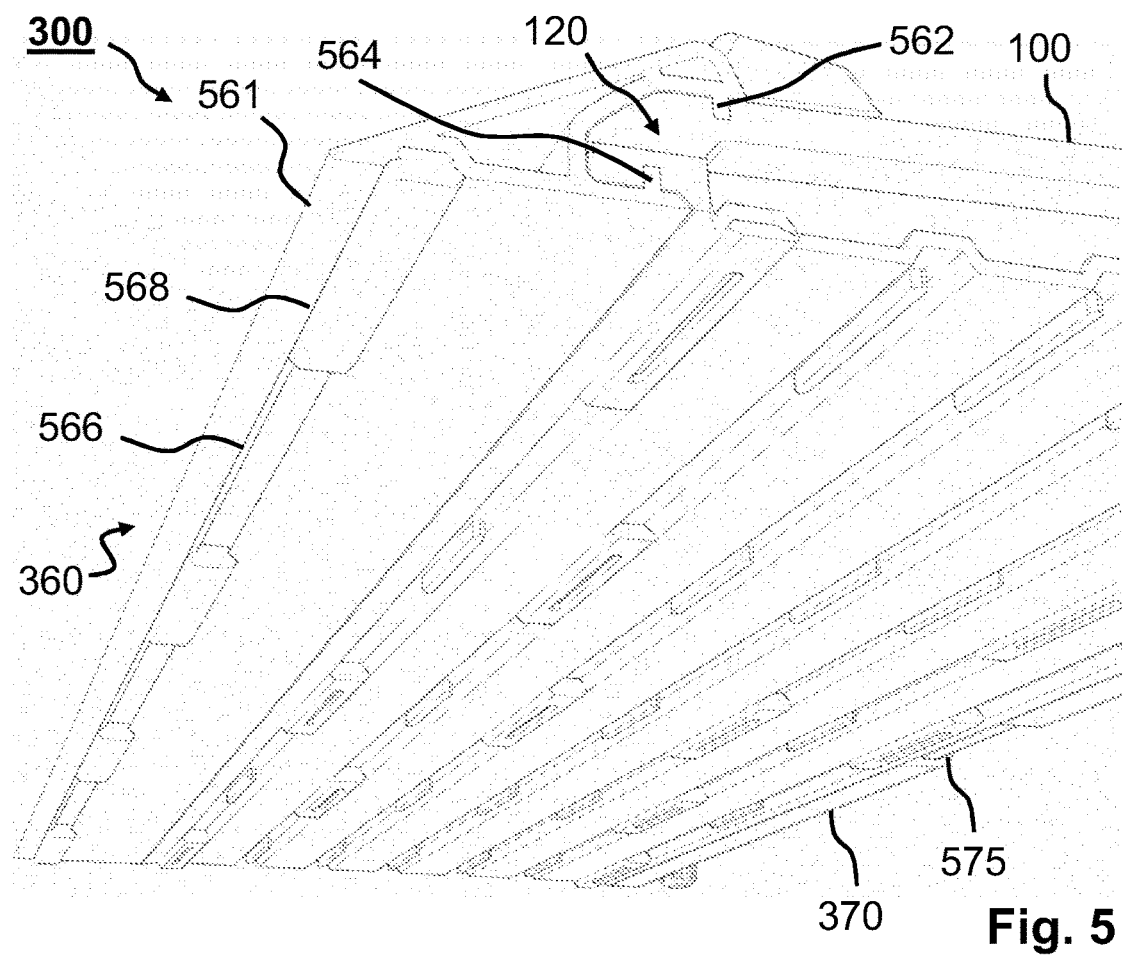
FIG. 5 shows an oblique bottom view of the keyboard from FIG. 3.

FIG. 5 shows an oblique bottom view of the keyboard 300 from FIG. 3. Herein, the base unit 100, its first coupling portion 120, the first accessory module 360 and part of the second accessory module 370 are shown of the keyboard 300 in the illustration of FIG. 5. Each accessory module 360, 370 includes the first mounting feature and the second mounting feature. Of the first accessory module 360, its first mounting feature 562 and the second mounting feature 564 are shown in FIG. 5. The mounting features 562, 564 are formed as rails here. The first mounting feature 562 engages the first coupling feature of the first coupling portion 120 of the base unit 100. The second mounting feature 564 engages the second coupling feature of the first coupling portion 120 of the base unit 100.

According to the embodiment illustrated here, the first accessory module 360 further includes at least one groove 566 and at least one pedestal 568 for the accessory module 360, here only as an example for pedestals 568. The groove 566 is formed to accommodate the at least one pedestal 568. Each pedestal 568 is mechanically coupleable or, as shown in FIG. 5, coupled to the groove 566.

What is also shown is a body 561 of the first accessory module 360. According to an embodiment, at least the body 561 of the first accessory module 360 is formed of aluminum.

Furthermore, according to the embodiment illustrated here, a cutout 575 for feeding through a plug of a connection cable for the keyboard 300 to the base unit 100 is formed in the second accessory module 370. Thus, the plug of the connection cable for the keyboard 300 is electrically connectable to the base unit 100 through the cutout 575.

Figure 6:
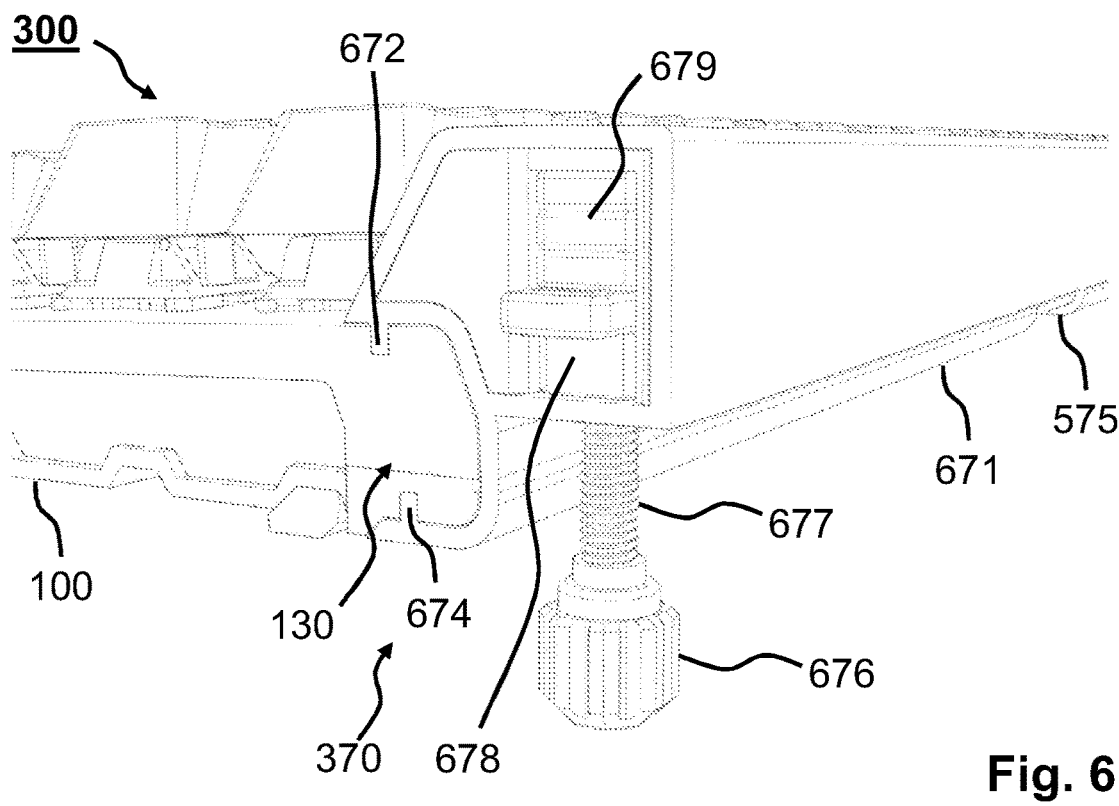
FIG. 6 shows a detailed view of part of the keyboard from FIG. 3.

FIG. 6 shows a detailed view of part of the keyboard 300 from FIG. 3. The part of the keyboard 300 shown in the illustration of FIG. 6 includes part of the base unit 100 with the second coupling portion 130 and part of the second accessory module 370. Of the second accessory module 370, FIG. 6 shows its first mounting feature 672 and second mounting feature 674, for example only one foot 676 with a threaded bar 677, a nut element 678 for screwing the threaded bar 677 in and an elastic means in form of a damper element 679, for example of silicone, for supporting the nut element 678 in addition to the cutout 575. For example, the foot 676 is formed of silicone, rubber or the like at least partially or in a portion. The foot 676 is continuously adjustable, more specifically adjustable in height, individually by means of the threaded bar 677 and the nut element 678. The second accessory module 370 comprises two subunits of a foot 676, a threaded bar 677, a nut element 678 and an elastic means each. Thus, the second accessory module 370 functions as a stand for the keyboard 300. Continuous height adjustment is enabled by the screw joint between the threaded bar 677, which is rigidly coupled to the foot 676, and the nut element 678. Furthermore, shock absorbers for the foot 676 is enabled by the damper element 679. The damper element 679 may be selected from different variants with different degrees of hardness.

The nut element 678 and the elastic means formed as damper element 679 are arranged in a body 671 of the second accessory module 370. According to an embodiment, at least the body 671 of the second accessory module 370 is formed of aluminum.

Figure 7:
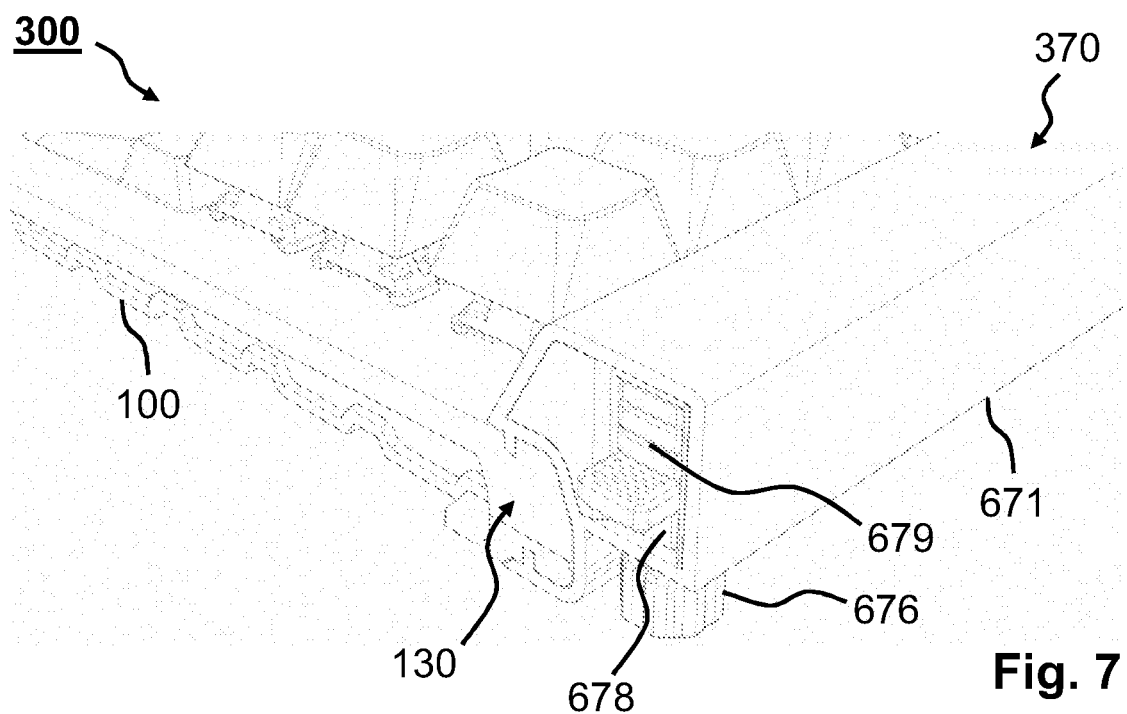
FIG. 7 shows a further detailed view of the part of the keyboard shown in FIG. 6.

FIG. 7 shows another detailed view of the part of the keyboard 300 from FIG. 6. In FIG. 7, the part of the keyboard 300 is illustrated merely from a slightly different perspective, wherein the part of the base unit 100 with the second coupling portion 130 and the second accessory module 370 with the foot 676, the nut element 678 and the damper element 679 are indicated explicitly.

Figure 8:
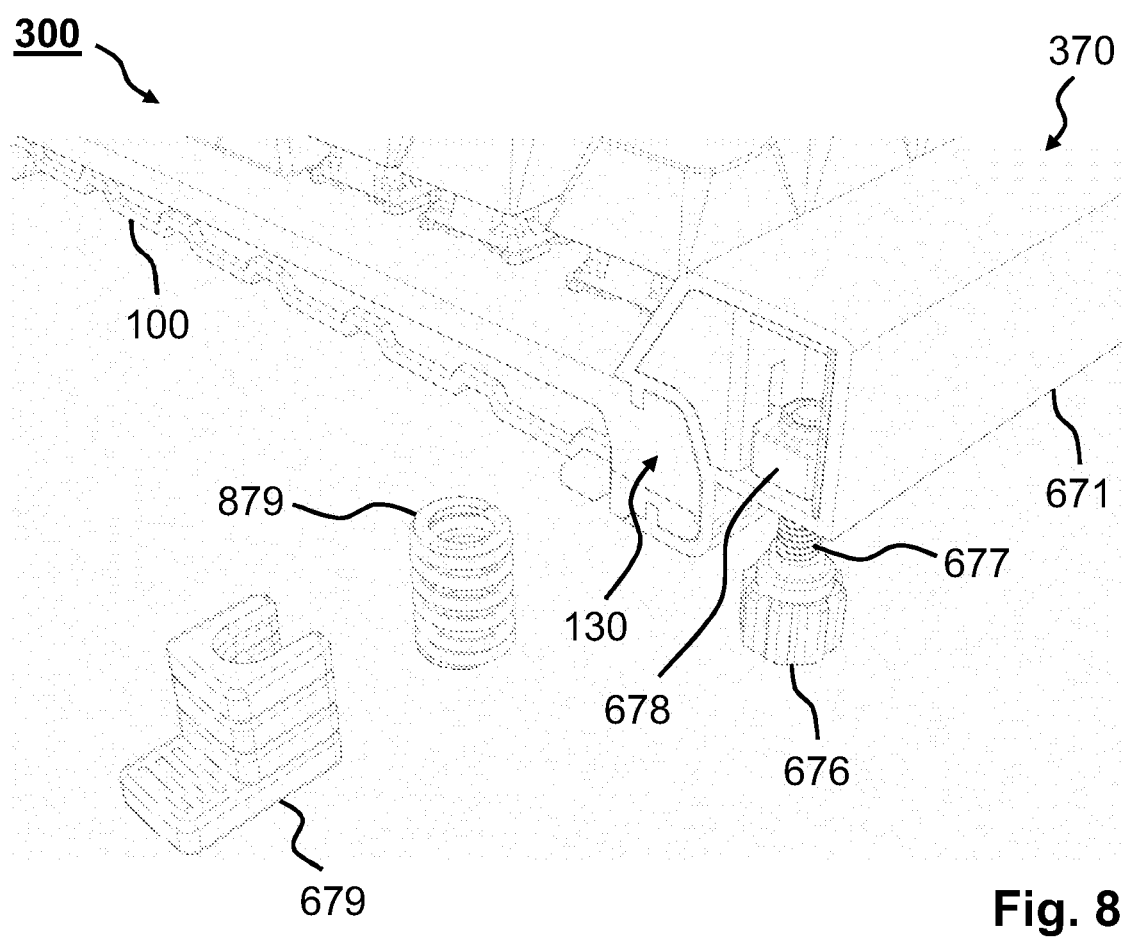
FIG. 8 shows a partially exploded view of the part of the keyboard shown in FIG. 6.

FIG. 8 shows a partially exploded view of the part of the keyboard 300 shown in FIG. 6. Herein, the nut element 678 is arranged in the second accessory module 370, wherein the foot 676 with the threaded bar 677 is partially screwed into the nut element 678. The elastic means in form of the damper element 679 is shown removed or disassembled from the second accessory module 370, more specifically from the body 671 thereof. So as to illustrate an alternative embodiment, an elastic means in form of a coil spring 879, in particular a compression spring, is illustrated in addition. The elastic means in form of the coil spring 879 is mountable instead of the damper element 679 in the second accessory module 370, more specifically in the body 671 thereof. The coil spring 879 may be selected from different variants with different spring rates.

Figure 9:
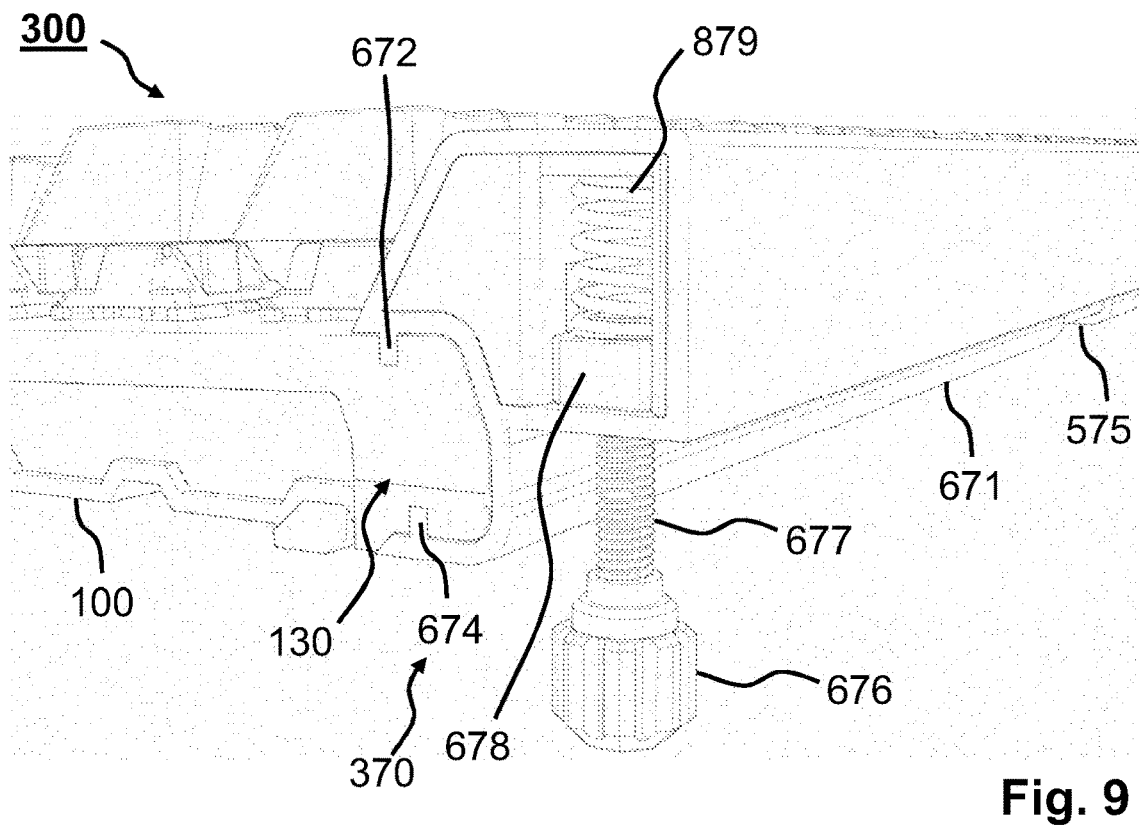
FIG. 9 shows a further detailed view of the part of the keyboard shown in FIG. 6.

FIG. 9 shows another detailed view of the part of the keyboard 300 shown in FIG. 6. The illustration and the keyboard 300 in FIG. 9 he correspond to the illustration and the keyboard 300 from FIG. 6, except that the elastic means is realized in form of the coil spring 879 from FIG. 8.

Figure 10:
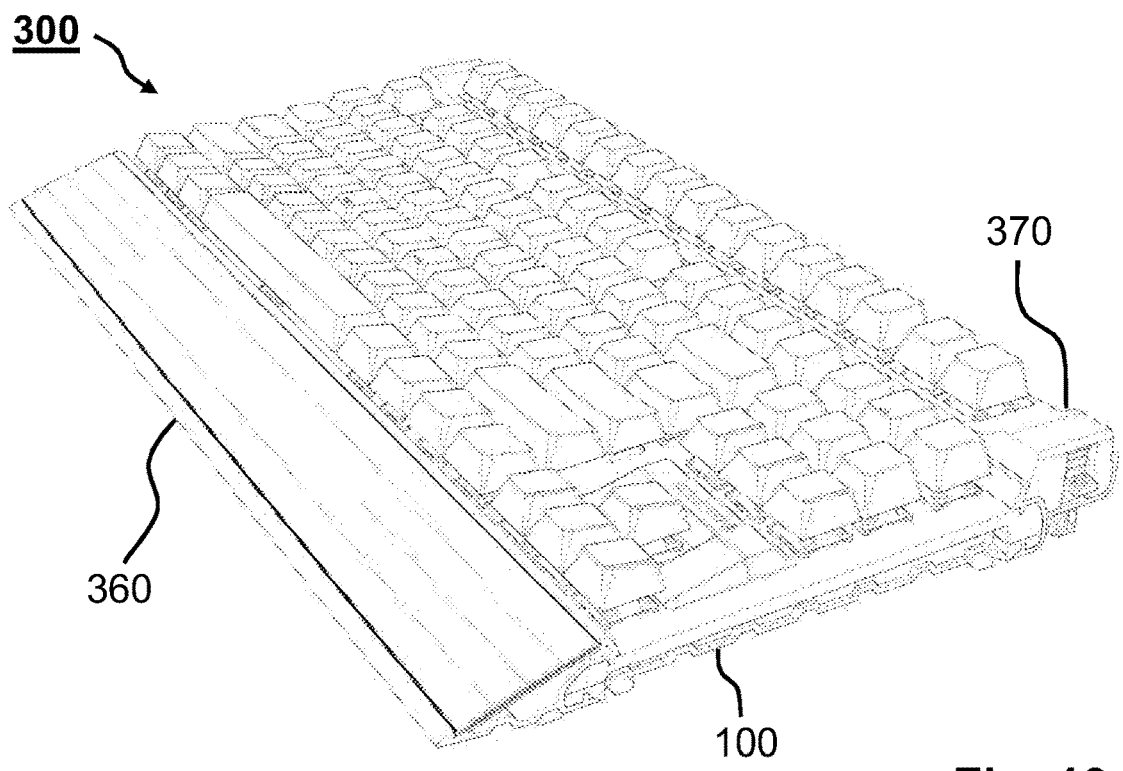
FIG. 10 shows an oblique top view of a keyboard according to an embodiment in a coupled state.

FIG. 10 shows an oblique top view of a keyboard 300 according to an embodiment in a coupled state. The keyboard 300 in FIG. 10 is similar to the keyboard from one of the previously described figures. The keyboard 300 includes the base unit 100 from one of the previously described figures or a similar base unit. Furthermore, the keyboard 300 includes at least one accessory module 360, 370. The at least one accessory module 360, 370 is mechanically coupleable or coupled to the at least one coupling portion of the base unit 100. In the coupled state, the at least one accessory module 360, 370 is mechanically coupled to the keyboard 300, more specifically mechanically to the at least one coupling portion of the base unit 300. The at least one accessory module 360, 370, in a state thereof in which it is coupled to the base unit 100, is formed to clasp around a long side of the base unit 100.

According to the embodiment illustrated here, the keyboard 300 includes a first accessory module 360 and a second accessory module 370. The first accessory module 360 is mechanically coupled to the first coupling portion of the base unit 100, and the second accessory module 370 is mechanically coupled to the second coupling portion of the base unit 100, i.e. the coupled state is given. In the coupled state, the first accessory module 360 clasps around a first long side of the base unit 100, and the second accessory module 370 clasps around a second long side of the base unit 100. According to the embodiment illustrated here, the first accessory module 360 is realized or formed as a hand heel rest or expounded hand heel rest. According to the embodiment illustrated here, the second accessory module 370 is realized or formed as a key bar or additional key bar.

Figure 11:
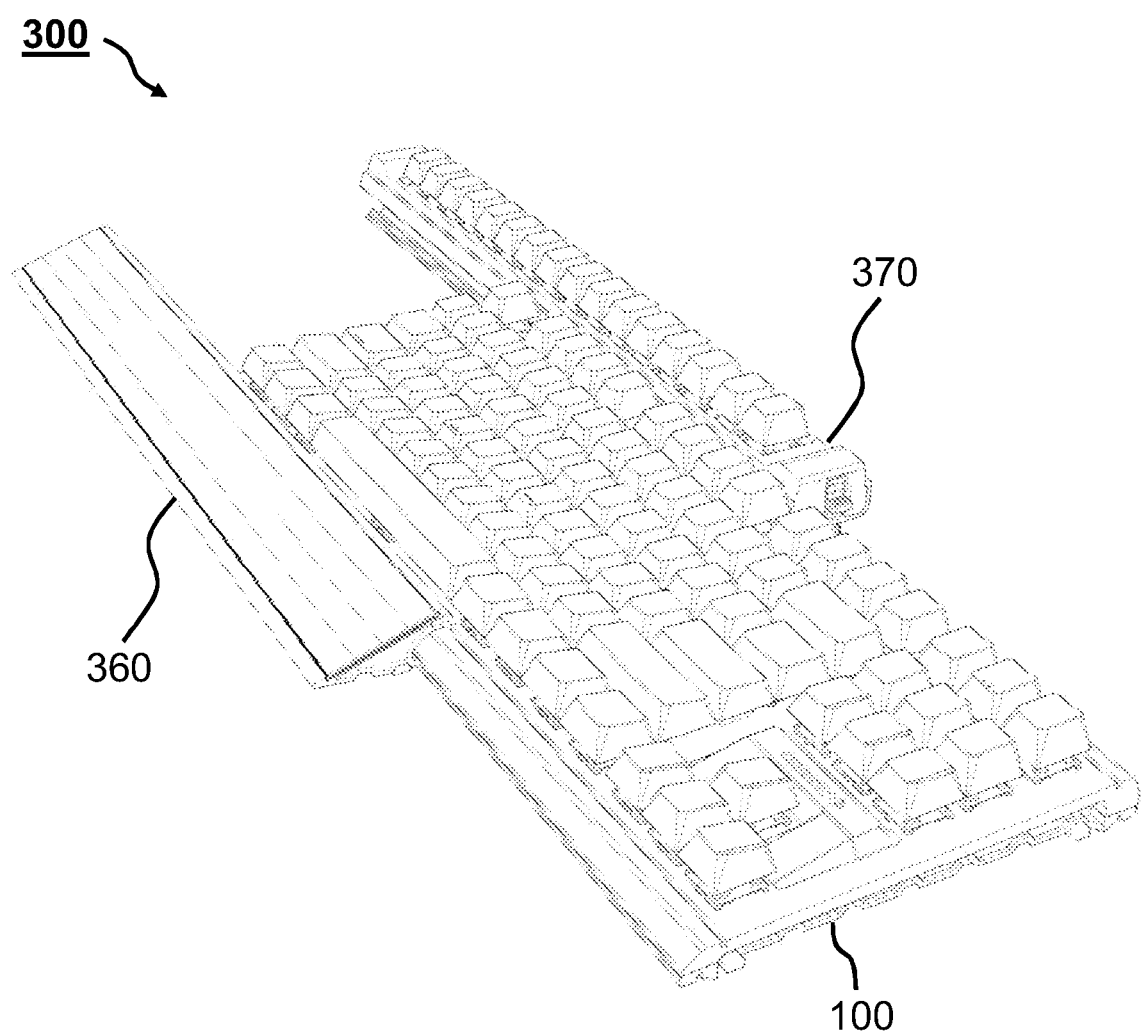
FIG. 11 shows an oblique top view of the keyboard from FIG. 10 in a partially coupled state.

FIG. 11 shows an oblique top view of the keyboard 300 from FIG. 10 in a partially coupled state. In the partially coupled state, the accessory modules 360 and 370 are shown during a coupling process by sliding the same on the coupling portions of the base unit 100. Only by way of example are the accessory modules 360 and 370 shown slid about halfway on the coupling portions of the base unit 100 in the illustration of FIG. 11. According to an embodiment, at least a body of the at least one accessory module 360, 370 is formed of aluminum. The accessory modules 360 and 370 shall be explained in greater detail with reference to subsequent figures.

Figure 12:
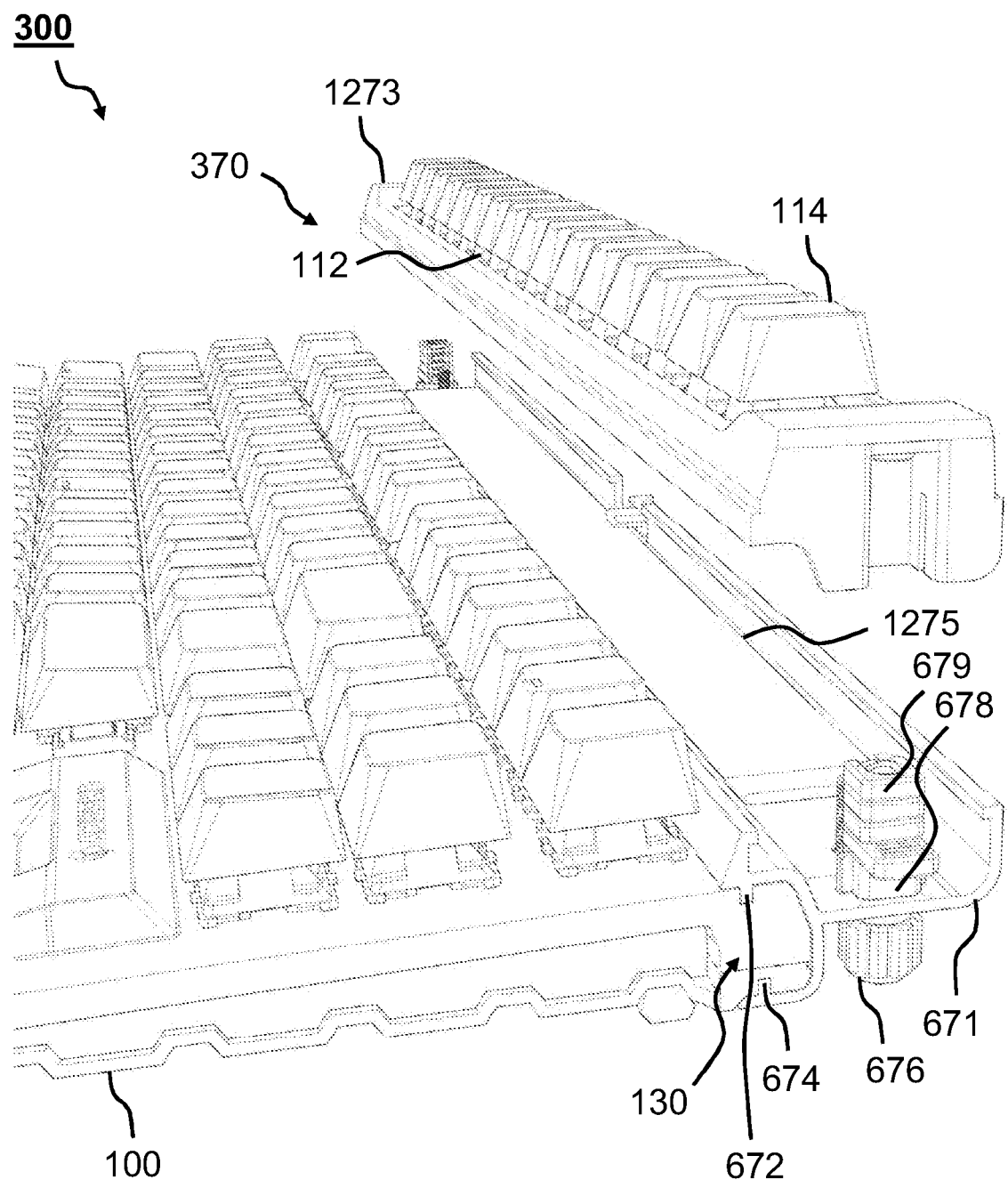
FIG. 12 shows a partially exploded view of part of the keyboard from FIG. 10.

FIG. 12 shows a partially exploded view of part of the keyboard 300 from FIG. 10. The part of the keyboard 300 shown in the illustration of FIG. 12 includes part of the base unit 100 with the second coupling portion 130 and the second accessory module 370. In FIG. 12, the first mounting feature 672 and second mounting feature 674, the body 671, two subunits, each having a foot 676 with a threaded bar, a nut element 678 for threading in the threaded bar 677 in and an elastic means in form of a damper element 679, for example of silicone, for supporting the nut element 678, wherein each subunit corresponds to the sub unit illustrated in FIG. 6 and/or FIG. 7, an accommodation portion 1273 for accommodating at least one key switch 112 and a circuit board 1275 with an electric circuit for the at least one key switch 112 are shown of the second accessory module 370.

According to the embodiment illustrated here, the accommodation portion 1273 is formed to accommodate a plurality of key switches 112, which are arranged in a line here. Furthermore, the accommodation portion 1273 he is formed as an insert out of plastics. The body 671 of the second accessory module 370 is formed of aluminum, for example. The accommodation portion 1273 is insertable into the body 671 of the accessory module. The circuit board 1275 here is arranged between the accommodation portion 1273 and the body 671 of the second accessory module 370. Thus, the second accessory module 370 functions not only as a key bar, but also as a stand for the keyboard 300.

Figure 13:
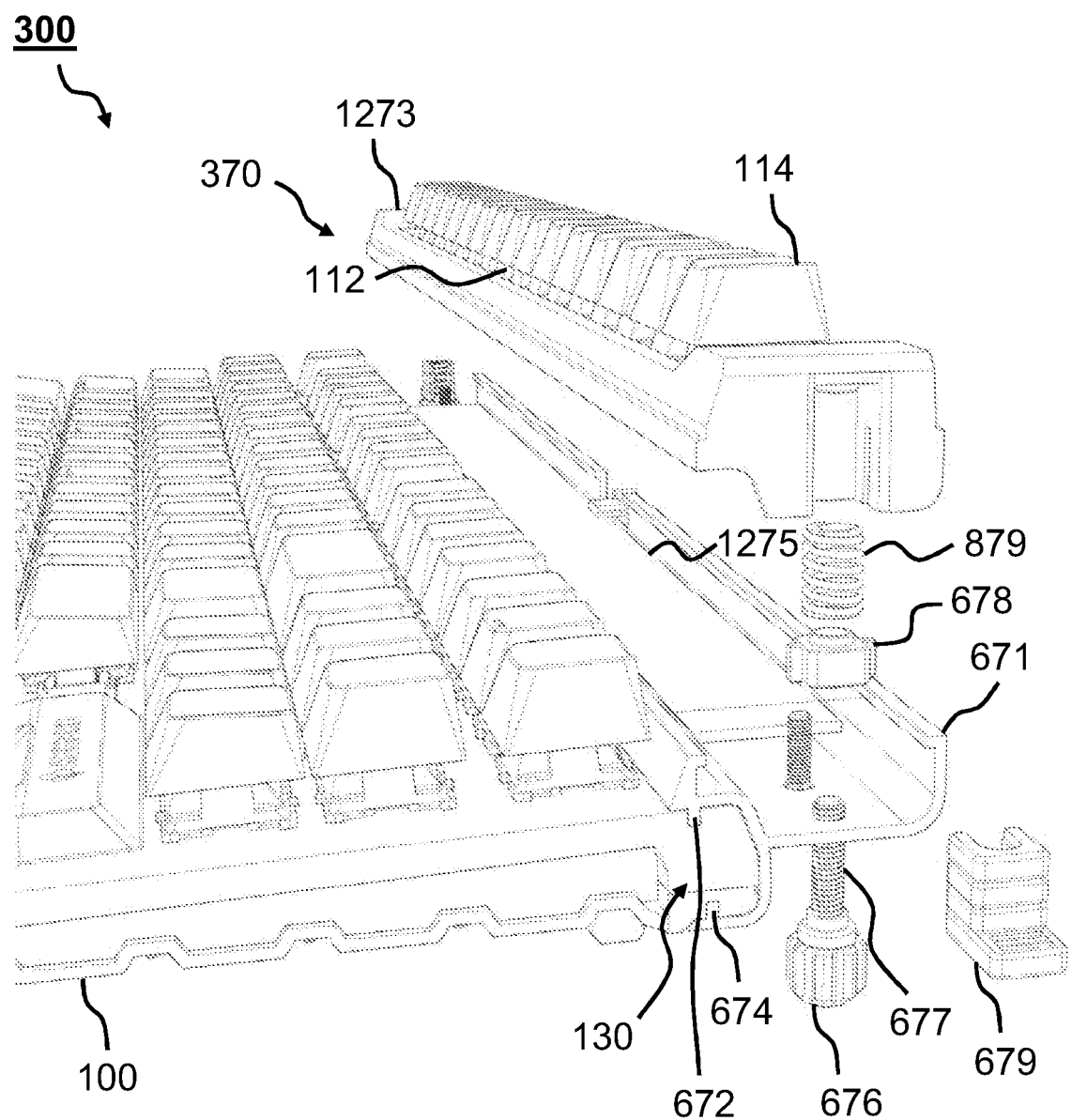
FIG. 13 shows another partially exploded view of the part of the keyboard shown in FIG. 12.

FIG. 13 shows another partially exploded view of the part of the keyboard 300 shown in FIG. 12. The illustration and the keyboard 300 in FIG. 13 here corresponds to the illustration and the keyboard 300 from FIG. 12, except that the elastic means is realized in form of the coil spring 879 from FIG. 8 and/or FIG. 9 and the damper element 679 is illustrated in addition as an option.

Figure 14:
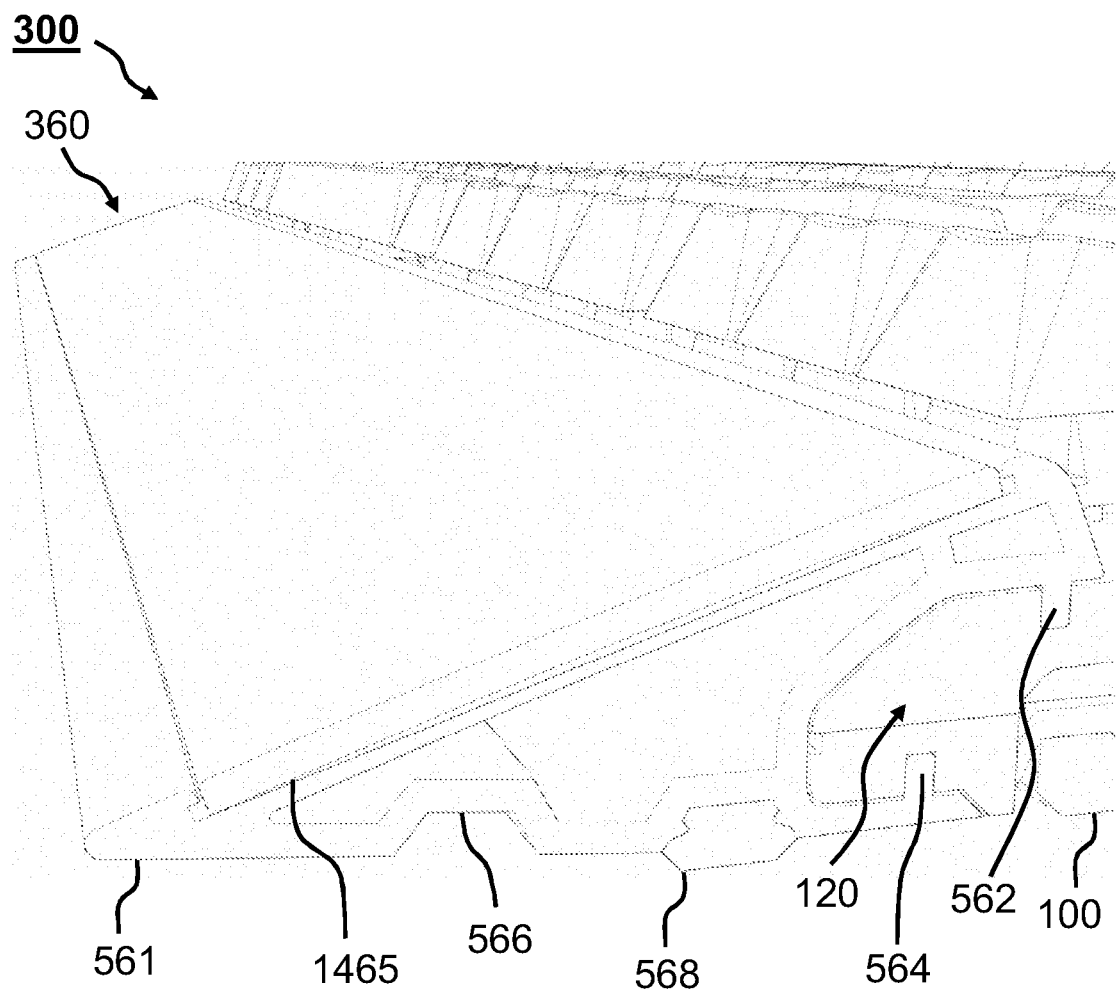
FIG. 14 shows a detailed view of a further part of the keyboard from FIG. 10.

FIG. 14 shows a detailed view of another part of the keyboard 300 from FIG. 10. In the illustration of FIG. 14, part of the base unit 100, its first coupling portion 120 and the first accessory module 360 are shown of the keyboard 300 here. The first accessory module 360 here is similar to the first accessory module from FIG. 5. The first mounting feature 562 and second mounting feature 564, further the body 561, the at least one groove 566, the at least one pedestal 568 and a hand rest portion 1465 are shown of the first accessory module 360 here.

Here, the mounting features 562, 564 are formed as a rails. The first mounting feature 562 engages the first coupling feature of the first coupling portion 120 of the base unit 100. The second mounting feature 564 engages the second coupling feature of the first coupling portion 120 of the base unit 100. According to the embodiment illustrated here, the first accessory module 360 also includes the at least one groove 566 and the at least one pedestal 568 for the first accessory module 360. The groove 566 is formed to accommodate the at least one pedestal 568. Each pedestal is mechanically coupleable or, as shown in FIG. 14, coupled to the groove 566. The body 561 of the first accessory module 360 is formed of aluminum. The hand rest portion 1465 of the first accessory module 360, which is realized as a hand heel rest, is formed of a material different from that of the body 561 of the first accessory module 360. According to the embodiment illustrated here, a window for introducing a decor element is arranged additionally in the hand rest portion 1465, or the hand rest portion 1465 is formed as such a window. For example, the hand rest portion 1465 here is formed of transparent plastics. According to the embodiment illustrated here, the hand rest portion 1465 is attached in a recess of the body 561 via positive locking, for example. According to another embodiment, the hand rest portion 1465 may be formed of a fabric, leather, wood or the like.

Figure 15:
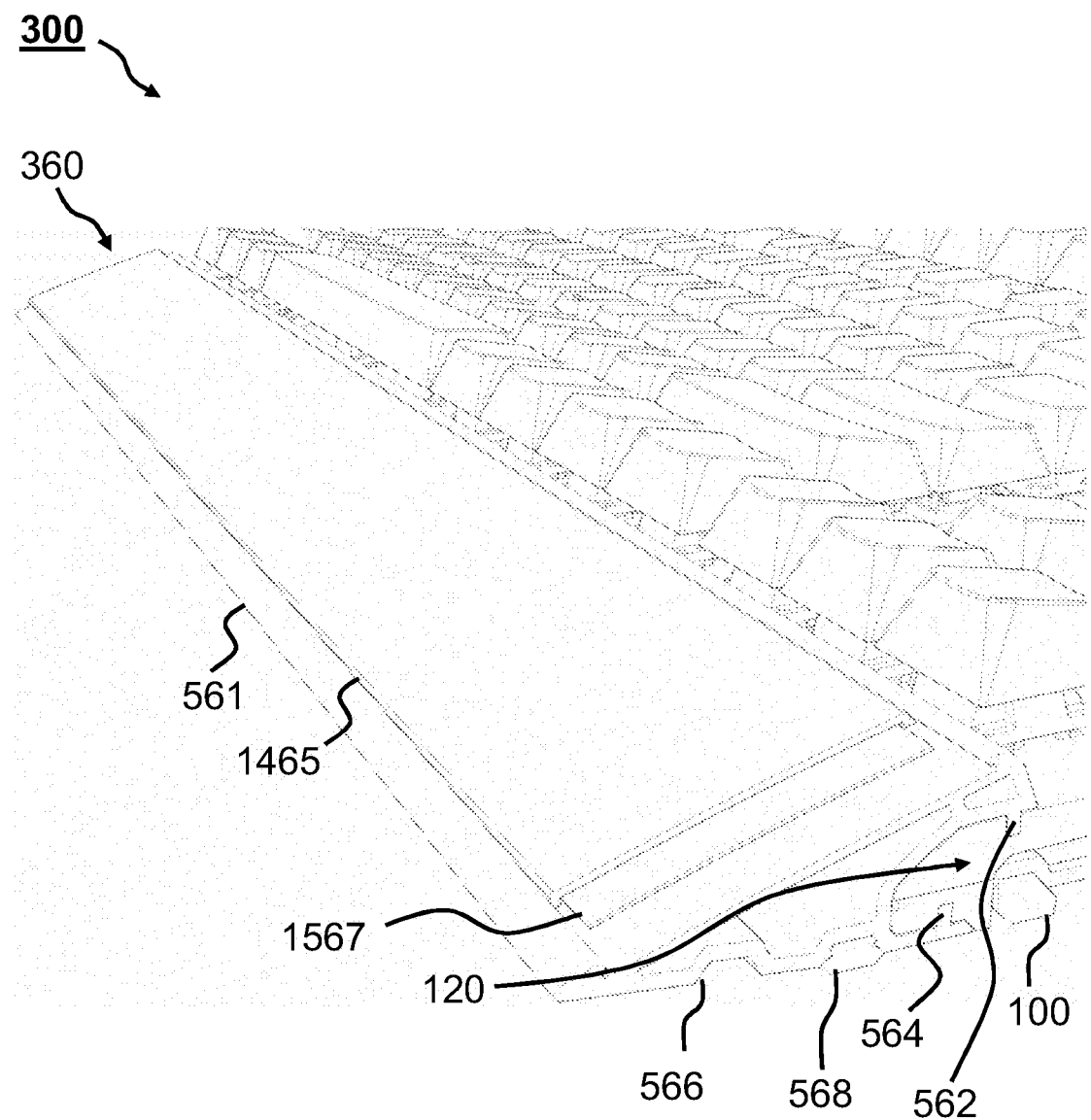
FIG. 15 shows a further detailed view of the further part of the keyboard shown in FIG. 14.

FIG. 15 shows another detailed view of the part of the keyboard 300 shown in FIG. 14. The illustration and the keyboard 300 as well as particularly the first accessory module 360 in FIG. 15 here corresponds to the illustration and the keyboard from FIG. 14, except that the hand rest portion 1465 is shifted relative to the body 561, and that a decor element 1567 is also shown. The hand rest portion 1465 is shiftable relative to the body 561, in order to arrange the decor element 1567 between the body 561 and the hand rest portion 1465 functioning as a window. The decor element 1567 is a decor foil, a photograph or the like, for example.

Figure 16:
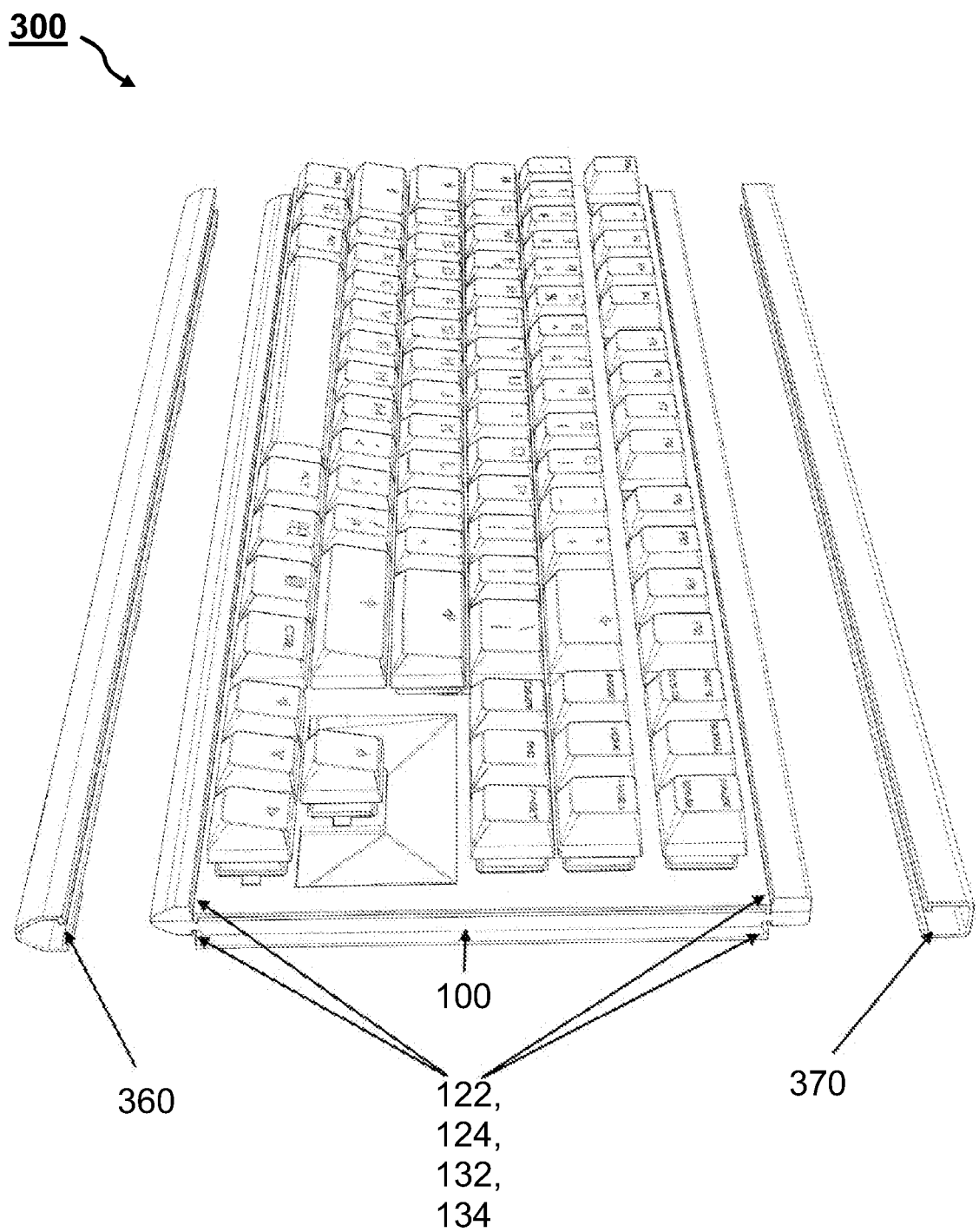
FIG. 16 shows a partially exploded view of a keyboard according to an embodiment.

FIG. 16 shows a partially exploded view of a keyboard 300 according to an embodiment. The keyboard 300 in FIG. 16 corresponds to or resembles the keyboard from one of the previously described figures. The base unit 100, its coupling features 122, 124, 132 and 134, the first accessory module 360 and the second accessory module 370 are shown of the keyboard 300 here. The coupling features 122, 124, 132 and 134 are formed as depressions or notches. The base unit 100 may also be referred to as a housing here. The accessory module 360 and 370 may also be referred to as profile rails.

In the illustration of FIG. 16, the accessory module 360 and 370 are shown as decoupled from the coupling features 122, 124, 132 and 134.

Figure 17:
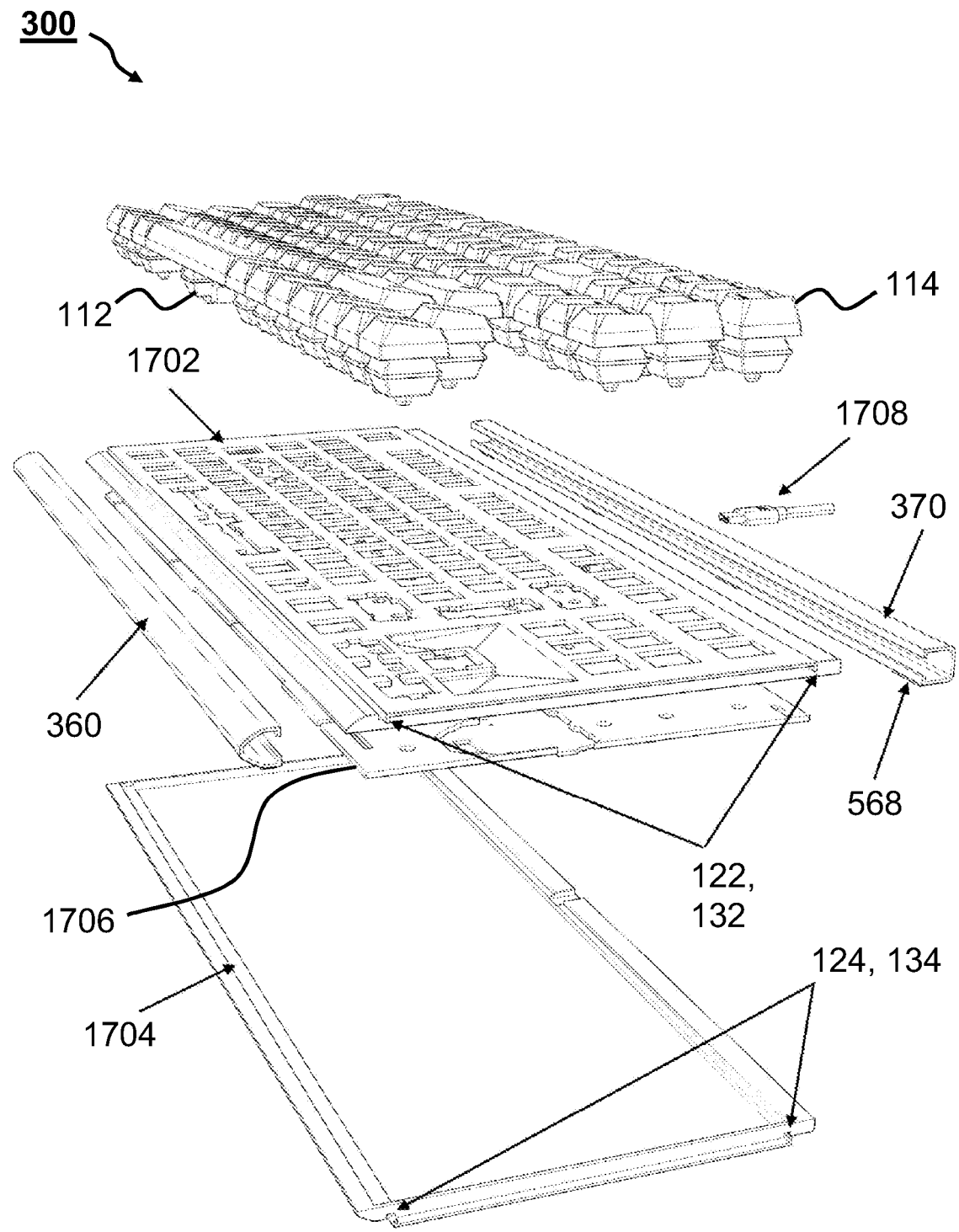
FIG. 17 shows an exploded view of a keyboard according to an embodiment.

FIG. 17 shows an exploded view of a keyboard 300 according to an embodiment. The keyboard 300 shown here corresponds to or resembles the keyboard from FIG. 16. The base unit 100, a plurality of key switches 112 and keycaps 114, an upper side 1702 corresponding to the first side of the base unit 100, in which the first coupling features 122 and 132 are formed, a lower side 1704 corresponding to the second side of the base unit 100, in which the second coupling features 124 and 134 are formed, a circuit board 1706 arranged between the upper side 1702 and the lower side 1704, a terminal plug 1708, the first accessory module 360 and the second accessory module 370 with only one pedestal 568, for example, are shown of the keyboard 300 here. The at least one pedestal 568 here is arranged on the second accessory module 370 additionally or alternatively to the first accessory module 360, different from previously described embodiments.

Figure 18:
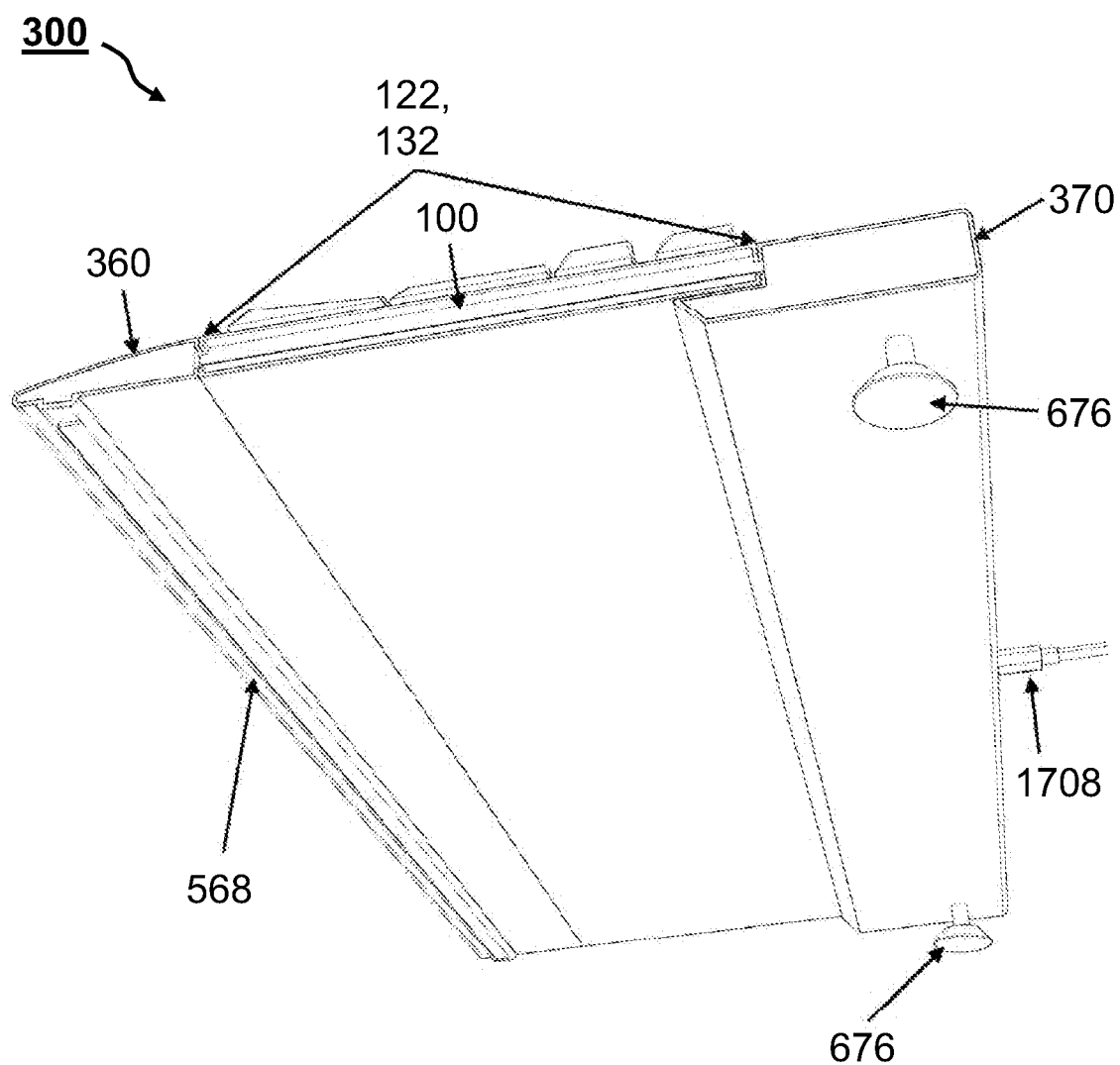
FIG. 18 shows an oblique bottom view of a keyboard according to an embodiment.

FIG. 18 shows an oblique bottom view of a keyboard 300 according to an embodiment. The keyboard 300 shown here corresponds to or resembles the keyboard from FIG. 16 and/or FIG. 17. The base unit 100, its first coupling features 122 and 132, the terminal plug 1708, the first accessory module 360 with an only exemplarily continuously formed pedestal 568 and the second accessory module 370 with only exemplarily two feet 676 are shown of the keyboard 300 here.

With reference to the previously described figures, in particular to FIG. 16 through FIG. 18, embodiments, background of embodiments and advantages of embodiments shall be summarized in other words in the following.

Keyboards similar to the keyboard 300 for operating electronic devices may, for example, be manufactured from an upper and a lower shell of plastics, similar to the upper side 1702 and the lower side 1704. In order to adapt to the economic needs of the user, many keyboards may be inclined via movable pedestals in the rear region of the keyboard. Since the pedestals only partially support the keyboard, the housing between the pedestals shall be rigid and stable so as not to deform due to the weight of the hands. For this reason, a conventional plastics housing may be reinforced with several reinforcing ribs and often by additional reinforcements of plastics or metal. According to embodiments, the keyboard 300 may do without reinforcement ribs and additional reinforcements of plastics or metal, which may lower manufacturing costs and weight and may increase construction space of the plastics housing. Conventional keyboards may comprise fixed or adjustable pedestals, as well as adjustable pedestals of different build. To this end, different keyboard housings can be manufactured with separate tools at high expense. According to embodiments, this can be avoided. Separate tools are manufactured at high expense also to produce keyboards that are different in design. According to embodiments, this may also be avoided. Thus, these problems may be solved according to embodiments of the present invention.

According to embodiments, the upper and lower housing halves, i.e. the upper side 1702 and the lower side 1704, of a keyboard 300 have depressions or notches as coupling features on their long sides each, which allow for sliding bracket-shaped metal or plastics profiles—here referred to as profile rail or accessory module 360, 370— manufactured by conventional extrusion molding, onto the assembled housing halves. The profile rails or accessory modules 360, 370 thus slid onto the keyboard housing close the upper and lower shell and also reinforce the same in an optimal way. The design of the keyboard 300 can be changed and the function of the adjustable pedestals or feet 676 can be improved through the static reinforcement of the keyboard 300 morphed to the outside by the profile rails or accessory modules 360, 370. Thus, also long keyboards 300 can be supported with only 2 pedestals or feet 676.

According to an embodiment, in a keyboard 300, the housing, which is also referred to as base unit 100, of the keyboard 300 has coupling features 142, 124, 132, 134 in form of depressions in longitudinal direction, which enable one or more profile rails of plastics, wood, glass, carbon fiber or metal to be slid on from the side via positive locking, on the upper side 1702 and on the lower side 1704. According to an embodiment, there is provided a keyboard 300 with a profile rail, also referred to as accessory module 360, 370, wherein at least one or more profile rails, i.e. at least one accessory module 360, 370, can be or are slid onto the housing or the base unit 100 of the keyboard 300 on the outside, in order to close upper side 1702 lower side 1704 of the keyboard 300. According to an embodiment, there is provided a keyboard 300 with a profile rail, also referred to as an accessory module 360, 370, wherein at least one or more profile rails or accessory modules 360, 370 can be or are slid onto the housing or the base unit 100 of the keyboard 300 on the outside, in order to statically reinforce the same in its longitudinal axis. According to an embodiment, there is provided a keyboard 300 with a profile rail, also referred to as an accessory module 360, 370, wherein at least one slid-on profile rail accommodates non-adjustable pedestals 568 or adjustable pedestals or feet 676 and forces acting on the housing or the base unit 100 of the keyboard 300 are diverted via the slid-on profile rail in at least 2 pedestals 568 and/or feet 676. According to an embodiment, there is provided a keyboard 300 with a profile rail, also referred to as an accessory module 360, 370, wherein a slid-on profile rail or a first accessory module 360 forms a hand heel rest or functions as such. According to an embodiment, there is provided a keyboard 300 with a profile rail, also referred to as an accessory module 360, 370, wherein the profile rail is locked or lockable via a USB terminal plug 1708 passing through the profile rail. According to an embodiment, there is provided a keyboard 300 with a profile rail, also referred to as an accessory module 360, 370, wherein the consumer may replace the profile rails or accessory modules 360, 372 technically and optically customize or repair the keyboard 300.

Where an embodiment comprises an "and/or" connection between a first feature and a second feature, this can be read such that the embodiment comprises both the first feature and the second feature according to a first variant and either the first feature or the second feature only according to a further variant.

REFERENCE NUMERALS 100 base unit
102 first side
104 second side
110 equipment portion
112 key switch
114 keycap
120 first coupling portion
122 first coupling feature
124 second coupling feature
130 second coupling portion
132 first coupling feature 134 second coupling feature
250 groove
252 land or rib
254 pedestal
300 keyboard
360 first accessory module
370 second accessory module
561 body
562 first mounting feature
564 second mounting feature
566 groove
568 pedestal
575 cutout
671 body
672 first mounting feature
674 second mounting feature
676 foot
677 threaded bar
678 nut element
679 elastic means or damper element
879 elastic means or coil spring
1273 accommodation portion
1275 circuit board
1465 hand rest portion
1567 decor element
1702 upper side
1704 lower side
1706 circuit board
1708 plug or terminal plug

The invention claimed is:

1. A base unit for a keyboard, wherein the base unit has a substantially rectangular layout, wherein the base unit comprises:
 an equipment portion, formed so that it can be equipped with a plurality of key switches for the keyboard, wherein the equipment portion is arranged on a first side of the base unit; and
 at least one coupling portion for mechanically coupling the base unit to an accessory module for the keyboard, wherein each coupling portion comprises a first coupling feature and a second coupling feature, wherein the first coupling feature is arranged on the first side of the base unit and the second coupling feature is arranged on a second side of the base unit facing away from the first side, wherein each coupling feature is formed along a longest side of the base unit between narrow sides of the base unit, wherein the first coupling feature is formed for positive locking with a first mounting feature of the accessory module, wherein the second coupling feature is formed for positive locking with a second mounting feature of the accessory module;
 wherein the first side and the second side of the base unit are main sides of the base unit formed in a plate-shaped manner, and
 wherein the longest side of the base unit is parallel to a spacebar.

2. The base unit according to claim 1, characterized in that each coupling feature is formed to be parallel with a longest side of the base unit and/or to be row sides of the base unit.

3. The base unit according to claim 1, characterized in that at least one of the coupling features is a notch, wherein at least one of the mounting features is a rail.

4. The base unit according to claim 1, characterized by two coupling portions, wherein the equipment portion is arranged between the coupling portions.

5. The base unit according to claim 1, characterized by at least one groove, which is formed on the second side of the base unit, the at least one groove defined parallel to a longest side of the base unit continuously between narrow sides of the base unit, wherein each groove is formed to accommodate at least one pedestal for the base unit.

6. The base unit according to claim 5, characterized by at least one pedestal, wherein each pedestal is mechanically coupleable or coupled to the at least one groove.

7. A keyboard comprising:
 a base unit having a substantially rectangular layout, the base unit including
  an equipment portion, formed so that it can be equipped with a plurality of key switches for the keyboard, wherein the equipment portion is arranged on a first side of the base unit, and
  at least one coupling portion, wherein each coupling portion comprises a first coupling feature and a second coupling feature, wherein the first coupling feature is arranged on the first side of the base unit and the second coupling feature is arranged on a second side of the base unit facing away from the first side, wherein each coupling feature is formed along a longest side of the base unit between narrow sides of the base unit, the longest side of the base unit being parallel to a spacebar; and
 at least one accessory module, each accessory module mechanically coupled to a corresponding coupling portion of the base unit, each accessory module including a first mounting feature and a second mounting feature;
 wherein the first coupling feature of each coupling portion of the base unit is formed for positive locking with the first mounting feature of the corresponding accessory module;
 wherein the second coupling feature of each coupling portion of the base unit is formed for positive locking with the second mounting feature of the corresponding accessory module; and
 wherein the at least one accessory module is formed to clasp around the longest side of the base unit.

8. The keyboard according to claim 7, characterized in that at least a body of the at least one accessory module is formed of aluminum.

9. The keyboard according to claim 7, characterized by at least one groove, wherein each groove is formed to accommodate at least one pedestal for the accessory module, and optionally in addition by at least one pedestal, wherein each pedestal is mechanically coupleable or coupled to the at least one groove.

10. The keyboard according to claim 7, characterized by at least one foot with a threaded bar and by a nut element for screwing in the threaded bar.

11. The keyboard according to claim 10, characterized by an elastic means for supporting the nut element, wherein the elastic means is formed as a coil spring, in particular a compression spring, or as a damper element, in particular of silicone.

12. The keyboard according to claim 10, characterized in that each foot is continuously adjustable individually by means of the threaded bar and the nut element.

13. The keyboard according to claim 7, characterized by an accommodation portion for accommodating at least one key switch and by a circuit board with an electric circuit for the at least one key switch.

14. The keyboard according to claim 13, characterized in that the accommodation portion is formed as an insert out of plastics, wherein the accommodation portion is arranged in a body of the at least one accessory module, wherein the circuit board is arranged between the accommodation portion and the body.

15. The keyboard according to claim 7, characterized in that the at least one accessory module is formed as a hand heel rest.

16. The keyboard according to claim 7, characterized in that the base unit is electronically configured as a slave device, wherein the at least one accessory module is electronically configured as a master device.

17. The keyboard according to claim 7, characterized in that a cutout for feeding through a plug of a connection cable for the keyboard to the base unit is formed in the at least one accessory module.

18. The keyboard according to claim 15, wherein the hand heel rest comprises a hand rest portion, which is formed of a different material as a body of the accessory module.

19. The keyboard according to claim 15, wherein the hand heel rest comprises a hand rest portion in which a window for introducing a decor element is arranged.

* * * * *

UNITED STATES PATENT AND TRADEMARK OFFICE
CERTIFICATE OF CORRECTION

PATENT NO. : 12,205,781 B2
APPLICATION NO. : 18/080961
DATED : January 21, 2025
INVENTOR(S) : Marcus Kuchler It is certified that error appears in the above-identified patent and that said Letters Patent is hereby corrected as shown below:

In the Claims

Claim 2, Column 13, Line 61, replace "row sides of the base unit." with "continuous between narrow sides of the base unit."

Signed and Sealed this
Fourth Day of March, 2025

Coke Morgan Stewart
*Acting Director of the United States Patent and Trademark Office*